United States Patent [19]

Suitlas

[11] 4,234,170
[45] Nov. 18, 1980

[54] MOVABLE CHARGING EMISSIONS CONTROL HOOD FOR BOF

[75] Inventor: John R. Suitlas, Wellsburg, W. Va.

[73] Assignee: National Steel Corporation, Pittsburgh, Pa.

[21] Appl. No.: 46,034

[22] Filed: Jun. 6, 1979

[51] Int. Cl.$^2$ ................................................ C21C 5/40
[52] U.S. Cl. ........................... 266/158; 98/115 VM; 266/216
[58] Field of Search ............... 266/158, 144, 159, 216, 266/236, 245; 75/60; 98/115 R, 115 VM; 414/185, 191, 291

[56] References Cited

U.S. PATENT DOCUMENTS

| | | | |
|---|---|---|---|
| 2,855,194 | 10/1958 | König | 266/35 |
| 3,357,820 | 12/1967 | Rasworschegg et al. | 75/60 |
| 3,411,896 | 11/1968 | Urban et al. | 75/60 |
| 3,743,264 | 7/1973 | Baum | 266/36 |
| 3,756,582 | 9/1973 | Overmeyer et al. | 98/115 R |
| 3,809,376 | 5/1974 | Plazier | 266/16 |
| 3,844,745 | 10/1974 | Hausberg et al. | 55/213 |
| 3,844,769 | 10/1974 | Calderon | 75/60 |
| 3,848,860 | 11/1974 | Maeda et al. | 266/18 |
| 3,854,709 | 12/1974 | Gaw | 266/158 |
| 3,863,906 | 2/1975 | Vicard | 266/16 |
| 3,908,969 | 9/1975 | Baum et al. | 266/17 |
| 4,081,269 | 3/1978 | Nominee et al. | 75/60 |

FOREIGN PATENT DOCUMENTS 184585 6/1955 Austria.
1147594 4/1963 Fed. Rep. of Germany.

*Primary Examiner*—L. Dewayne Rutledge
*Assistant Examiner*—Michael L. Lewis
*Attorney, Agent, or Firm*—Shanley, O'Neil & Baker

[57] ABSTRACT

A movable emissions control hood is mounted for insertion between a fixed emissions processing hood and the open mouth of a converter vessel of a metallurgical furnace to capture emissions from the converter vessel and convey them into the existing emissions processing hood when the converter vessel is rotated to the charging position. The movable hood cooperates with the converter vessel structure to effectively limit the admission of air and gases except from an area above the open mouth of the converter vessel.

30 Claims, 8 Drawing Figures

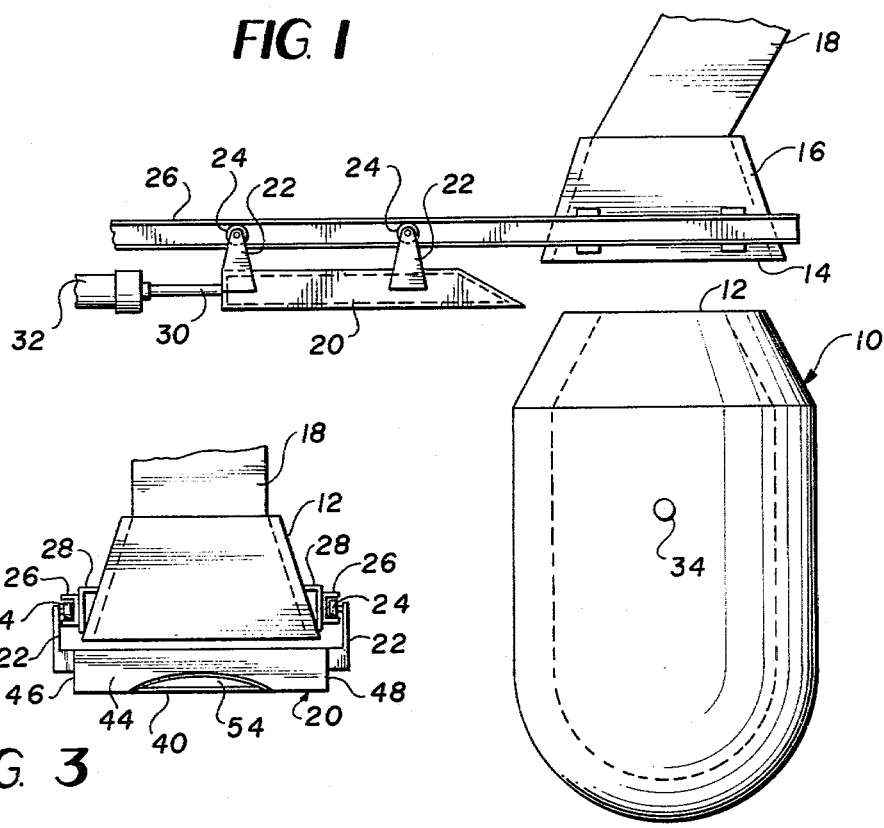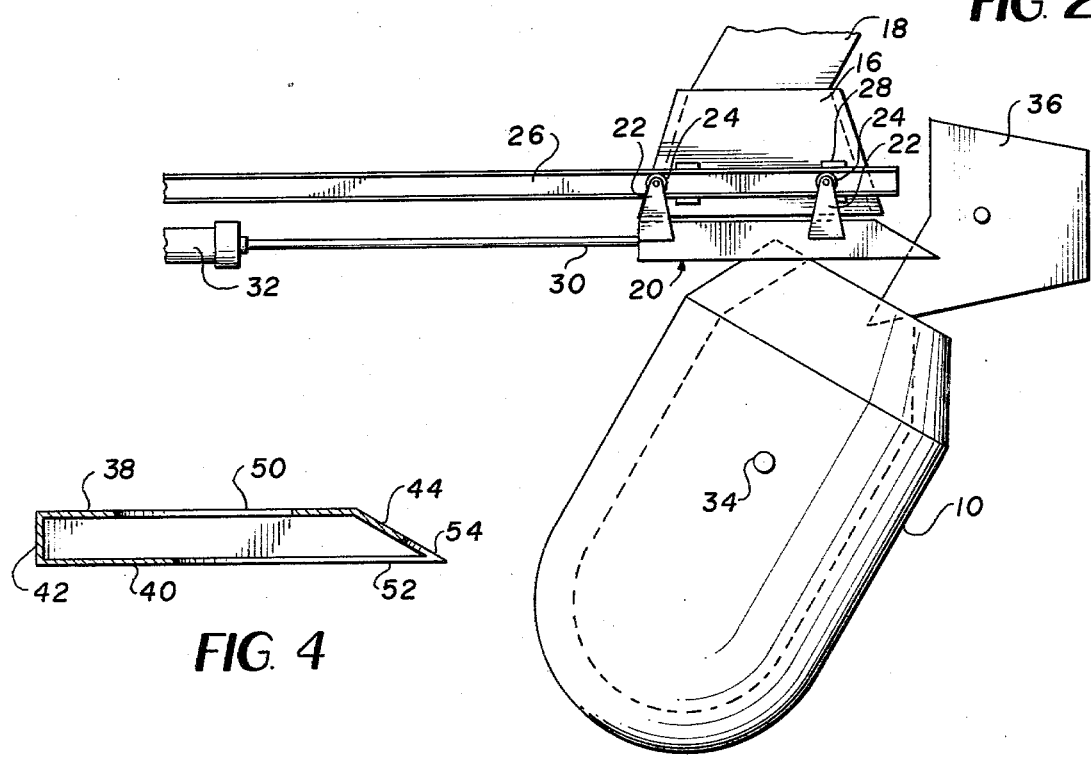

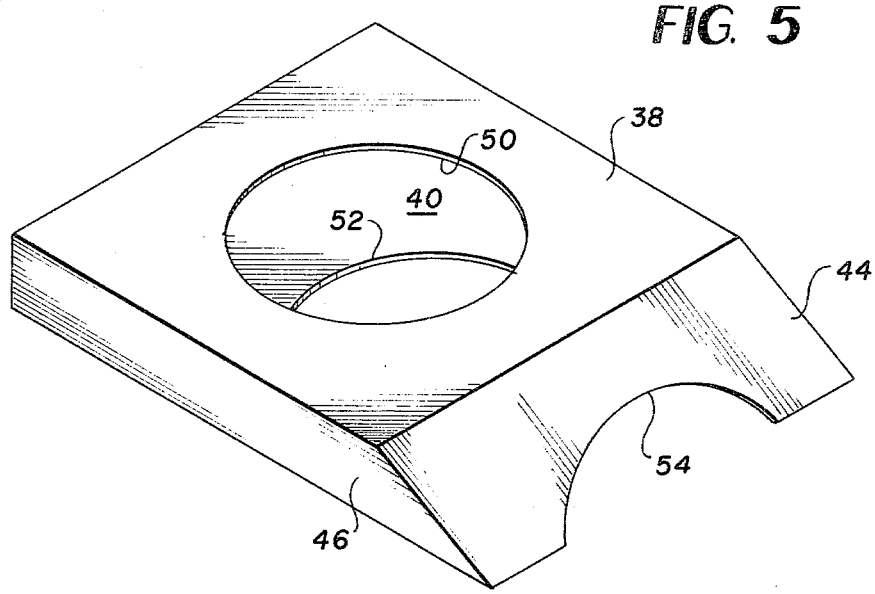
FIG. 5
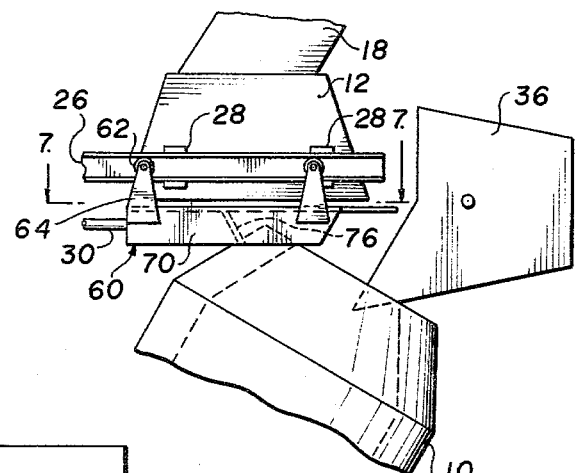
FIG. 6
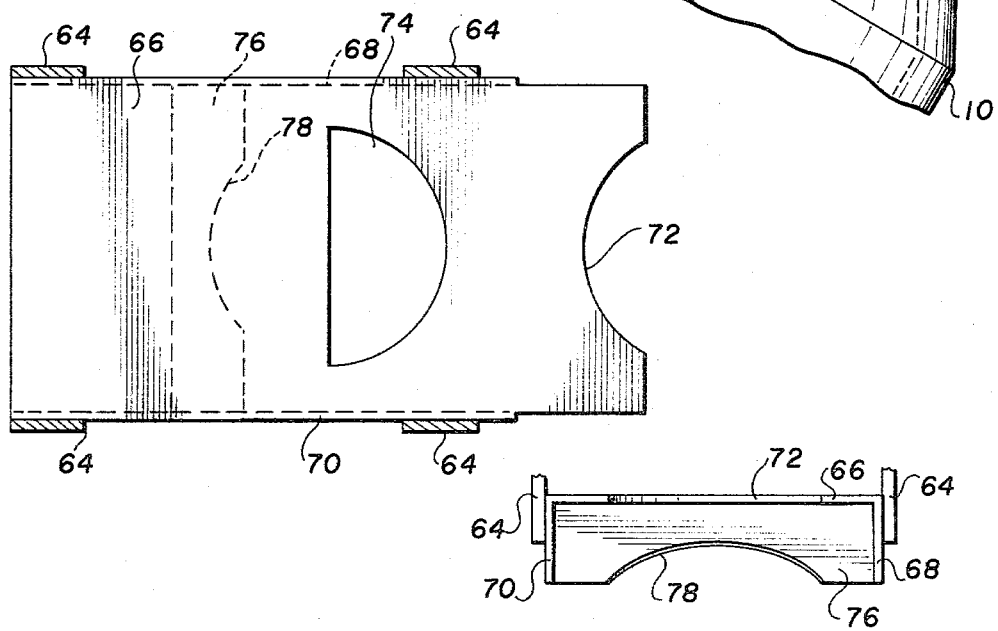
FIG. 7
FIG. 8

MOVABLE CHARGING EMISSIONS CONTROL HOOD FOR BOF

BACKGROUND OF THE INVENTION

1. Field of the Invention

This invention relates to apparatus for controlling emissions from a metallurgical vessel and more particularly to an emissions control system having an improved movable hood structure for capturing emissions during charging of the vessel.

2. Description of the Prior Art

In the manufacture of steel utilizing a basic oxygen process, molten pig iron is poured from a ladle into the metallurgical vessel of a basic oxygen furnace (BOF) where the iron is refined by blowing oxygen onto its surface. During charging of the furnace, the vessel is rotated from its normal upright position employed during the refining or blowing process to a position in which the entrance to the vessel is spaced laterally from the conventional emissions processing equipment. Due to the extreme temperatures and large volume of emissions from the vessel during charging, they generally have not been effectively controlled during this portion of the steel making process. Rotating the BOF vessel to the charging position increases the distance from its mouth to the entrance of the conventional stationary emissions processing hood, allowing time for the emitted fumes to expand and entrain substantial volumes of ambient air which, combined with the lateral misalignment of the mouth of the vessel from the processing hood, makes collection more difficult and a substantial portion of such emissions have escaped into the surrounding atmosphere.

In the past, various attempts have been made to capture and control emissions during charging of a BOF. These attempts have included installation of expensive auxiliary emissions processing equipment with separate exhaust hoods and collectors adjacent to or surrounding the existing processing hood and equipment conventionally used during the refining process. Examples of such apparatus may be found in U.S. Pat. Nos. 3,844,745; 3,863,609; and 3,908,969. Such duplication of equipment not only adds substantially to the expense of producing steel, but also greatly complicates charging and tapping the furnace due to the congestion caused by the added equipment.

Another known means for controlling charging emissions is to construct an enclosure surrounding the metallurgical vessel in all its rotational positions. Such enclosure structures may be equipped with auxiliary emission exhausting and handling apparatus or may rely entirely upon the process equipment utilized during the refining process. Examples of enclosure structures utilized in connection with metallurgical vessels may be found in U.S. Pat. Nos. 3,743,264; 3,809,379; and 4,081,269.

It has also been proposed to provide a fume collecting hood structure which is movable with the metallurgical vessel whereby the fume collection apparatus is in position to collect emissions under any angular rotational position of the furnace, an example of this type of apparatus being disclosed, for example, in U.S. Pat. No. 3,844,769.

Attempts have also been made to control charging emissions from a BOF by attempting to induce the flow of the charging emissions into the existing process hood. One such device, shown in U.S. Pat. No. 3,854,709, employs a movable damper plate which is positioned over a major portion of the entrance of the process hood, leaving a small portion uncovered nearest the open mouth of the BOF vessel in the charging position. This reduced opening into the portion of the hood closest the BOF vessel mouth creates an increased velocity in this area to capture a greater portion of the emissions. While this apparatus is at least partially effective in that it is able to capture a larger portion of the emissions than would be captured by the existing process hood alone, an objectionable proportion of the emissions are still permitted to escape into the atmosphere.

Each of the emission control systems mentioned above have been at least partially effective in capturing emissions during charging of a BOF; however, these systems have not been entirely satisfactory for various reasons. Accordingly, it is a primary object of the present invention to provide an improved movable control hood for use in connection with existing process emission control systems to capture emissions from a BOF during charging.

Another object of the invention is to provide such a movable emissions control hood which is simple to operate and which occupies a minimum of space.

Another object of the invention is to provide such an improved movable emissions control hood which eliminates the necessity for auxiliary emissions processing equipment for providing effective capture of the emissions from a BOF when the vessel is moved from its normal upright blowing or refining position.

SUMMARY OF THE INVENTION

In the attainment of the foregoing and other objects and advantages of the invention, an important feature resides in providing a movable emissions control hood which can be positioned beneath an existing process hood when the BOF vessel is in the charging position to provide more efficient capture of emissions during charging while, at the same time, preventing excess ambient air from being drawn into the process hood. In accordance with one embodiment of the invention, this is accomplished by providing a movable hood in the form of a relatively thin, generally rectangular conduit or duct which is movable into an operative position between the BOF vessel and the existing process hood when the vessel is in the charging position. During charging, a first opening formed in the top of the movable duct communicates with the existing process hood and a second, laterally offset opening is located generally above the mouth of the BOF to effectively shift the entrance of the existing process hood laterally and downwardly. The movable hood is shifted laterally out of the way of the BOF vessel before rotating the vessel back to the blowing or refining position.

In accordance with another embodiment of the invention, essentially the same effect is achieved by employing a substantially flat plate which is moved into position over the existing process hood when the BOF vessel is in the charging position. An opening in the plate provides an entrance to the process hood on the side thereof closest the mouth of the BOF, with the plate projecting outwardly above the open mouth of the BOF vessel to assist in confining the emissions and directing the emissions into the existing process hood through the opening in the plate. Downward projecting skirt means closely surrounds the external surface of the BOF vessel on the side of the existing process hood away from the open mouth of the vessel to effectively exclude ambient air. The skirt means cooperates with the horizontally projecting plate and the vessel structure to effectively shift the entrance to the existing hood much in the same manner as in the embodiment using the movable duct. This duct effect, in combination with the increased velocity produced by the reduced size of the opening in the plate as compared with the size of the entrance into the fixed hood, is highly effective in capturing charging emissions.

BRIEF DESCRIPTION OF THE DRAWINGS

Other features and advantages of the invention will become apparent from the detailed description contained hereinbelow, taken in conjunction with the drawings, in which:

FIG. 1 is a side elevation view schematically illustrating one embodiment of the invention in use in conjunction with a basic oxygen furnace and a conventional process hood, with the BOF vessel being illustrated in the upright refining position and with the movable hood according to the invention being shown in the retracted or non-use position;

FIG. 2 is a view similar to FIG. 1 showing the movable hood in the use position and the BOF vessel in the charging position;

FIG. 3 is an end elevation view of the movable hood of FIG. 1 shown installed on the existing process hood;

FIG. 4 is a sectional view, taken on line 4—4 of FIG. 3;

FIG. 5 is an isometric view of the movable hood structure shown in FIG. 1;

FIG. 6 is a fragmentary side elevation view similar to FIG. 2 and illustrating an alternate embodiment of the invention;

FIG. 7 is a sectional view taken on line 7—7 of FIG. 6; and

FIG. 8 is an end elevation view of the structure shown in FIG. 7.

DESCRIPTION OF THE PREFERRED EMBODIMENTS

Referring now to the drawings in detail, a BOF vessel is indicated generally by the reference numeral 10 and shown in FIG. 1 in the upright metal refining position with its open mouth 12 located directly beneath the open entrance 14 of a conventional, fixed process hood 16. As is conventional practice, the downwardly directed open end 14 of hood 16 is spaced from the open mouth 12 to permit a controlled amount of ambient air to be drawn into the hood 16 along with the gaseous effluents from the open mouth 12 during the refining process. This mixture of the gaseous emissions from the BOF and air passes through the conduit or duct 18 to processing apparatus at a remote location in accordance with conventional practice. In accordance with the present invention, a movable hood assembly 20 is supported by suspension brackets 22 and wheels 24 on a pair of channel shaped tracks 26 extending one along each side of the fixed hood 16. As shown in FIG. 3, tracks 26 are rigidly mounted by brackets 28 directly onto the hood 16 so that any movement of the hood 16 as a result of thermal expansion of the conduit 18 or for any other reason, will not result in relative movement between the movable hood and the bottom open end of the fixed hood. The movable hood 20 is moved horizontally along tracks 26 between the retracted non-use position shown in FIG. 1 and the extended or use position shown in FIG. 2 by suitable power means such as the rod 30 connected to a piston mounted in the fluid actuated cylinder 32.

As shown in FIG. 2, the BOF vessel 10 is moved to the charging position by rotating the vessel about its trunions 34 to move the mouth 12 from beneath the open end 14 of hood 16 sufficiently to permit the vessel to be charged with scrap and molten pig iron, with a ladle 36 being shown in FIG. 2 in the position occupied while pouring molten iron into the vessel. During the charging operation, and particularly the phase during which molten iron is charged into the furnace, a large volume of emissions, including substantial quantities of entrained fine particulate matter, is emitted from the mouth of the vessel. Under normal conditions, the emissions form a large plume, a large portion of which escapes the fixed capture hood to be dissipated into the atmosphere. The movable hood according to the present invention is effective in capturing these emissions and directing them into the existing process hood, while avoiding entraining excess ambient air into the hood during the charging operation.

In the embodiment of the invention shown in FIGS. 1–5, the movable hood 20 is a hollow conduit or boxlike structure having a trapezoidal configuration in vertical longitudinal cross section, i.e., in a vertical plane parallel to the rails 26, and a rectangular transverse vertical cross section. The hood includes substantially parallel spaced top and bottom walls 38, 40, a vertical end wall 42 which, for convenience, will be referred to as the back wall, an inclined front end wall 44, and opposed parallel side walls 46, 48. Top wall or plate 38 has a central opening 50 formed therein, and bottom wall 40 has a generally "U" shaped opening extending from its forward edge rearwardly to a position at least partially underlying the opening 50 in wall 38. Opening 52 extends into the inclined front wall 44, forming a generally arch-shaped cut out 54 in the inclined front wall 44. As seen in FIGS. 4 and 5, the opening 50 is located substantially centrally within the rectangular plate defining the top wall 38. The top wall 38 preferably completely underlies the bottom opening 14 of hood 16, when the movable hood is in the use position. The size of opening 50 is preferably approximately one-half the size of bottom opening 14 in the fixed process hood 16 so that, when the movable hood is in the use position with wall 38 spaced closely adjacent the bottom edge of the fixed hood as shown in FIG. 2, the entrance into the fixed process hood is restricted to approximately one-half its normal opening size, i.e., the size of opening 50.

The "U" shaped opening in bottom wall 40 is offset toward the front of hood 20 with respect to opening 50 so that the space from the vertical back wall 42 to the opening 52 is substantially greater than the distance to the opening 50. This relationship can, of course, be varied to produce the desired velocity of gases passing through the opening 50. Also, the space relation between the top surface of the top plate 38 and the bottom edge of the fixed process hood can be varied, as desired, to control the flow of ambient air into the fixed hood through this space.

In use of the movable hood thus far described, the BOF vessel 10 is initially rotated about the trunions 34 to the position shown in FIG. 2. During this rotation, the movable hood 20 remains in the retracted position shown in FIG. 1. Normally, any scrap to be processed will initially be dumped into vessel 10 from a skip box or the like and, to avoid possible interference with the movement of scrap, the movable hood normally may remain in the retracted position until such scrap is in the BOF vessel. As is apparent from FIG. 2, when the BOF vessel is in the charging position, the upper extremity of its mouth portion projects above the plane of bottom wall or plate 40. As the cylinder 42 is actuated to project the movable hood into the use position, the arch-shaped cutout 54 in the inclined front wall 44 permits the movable hood to pass over this upwardly projecting lip portion of the BOF vessel until the rearmost edge portion of the "U" shaped opening 52 engages the outer peripheral surface of the BOF vessel 10. The curved surface of the opening 52 conforms generally to and extends around the portion of the vessel projecting upwardly into the hollow interior of the movable hood 20. The opposed side edges of opening 52 extend forwardly to intersect the inclined wall 44 so that opening extends above and preferably substantially completely overlies the open top 12 of the BOF vessel in the charging position. The arch-shaped cutout 54 in the inclined wall 44 nevertheless provides access to the open mouth for pouring molten pig iron into the interior of the vessel from the ladle 36. In this position, the portions of the bottom wall extending along the sides of the "U" shaped opening project laterally out from the open mouth, acting as baffles to help constrain the emissions until they are captured and drawn through the hollow interior of the movable hood into the existing process hood.

The configuration of the bottom wall effectively blocks entrance of excess ambient air into the opening 52 due to the cooperation with the outer surface of the BOF vessel. Some ambient air will, of course, be drawn in near the forward end of the opening 52, and this is desired to assure capture of the emissions; however, by effectively limiting the entrance of ambient air into the system to that which is drawn in around the open mouth of the BOF, a higher velocity is induced in this area to further assure against escape of excessive emissions into the surrounding atmosphere.

Once the molten pig iron is charged into the BOF vessel and the ladle 36 removed, the vessel can be rotated to its upright blowing position substantially simultaneously with retraction of the movable capture hood so that, when the movable hood is fully retracted, the BOF is in its upright position and further emissions pass directly into the open mouth 14 of fixed process hood 16.

Referring now to FIGS. 6–8, an alternate embodiment of the invention is shown as including a movable hood assembly designated generally by the reference numeral 60 supported on the rails 26 for movement therealong by the rod 30 in the same manner as the movable hood assembly 20 described above. Hood assembly 60 is supported by wheels or rollers 62 mounted on support brackets 64 in the same manner as that described above. The movable hood 60 comprises a horizontal plate 66 having a pair of vertically extending side plates 68, 70 mounted on and projecting downwardly from its opposed lateral edges. A generally arcuate notch 72 is formed in the forward edge of plate 66, and a generally semicircular opening 74 is formed in the plate, with opening 74 extending forward from approximately the midsection of the plate. An inclined baffle plate 76 extends between side walls 68 and 70 and has its top edge rigidly joined to the undersurface of plate 66. Baffle plate 76 is inclined downwardly and forwardly from the juncture with plate 66, and has a generally arcuate notch 78 formed in and extending upwardly from its lower edge. The top edge of the inclined plate 76 is joined to the bottom surface of plate 66 along a transverse line extending substantially rearwardly of the opening 74, i.e., on the side of opening 74 opposite to the notch 72 in plate 66.

The arcuate notch 78 in the inclined plate 76 is adapted to engage the outer peripheral surface of the BOF vessel 10 in substantially the same manner as the arcuate surface of the opening 52 in the movable hood 20 described above. Thus, baffle 76 defines a sealing plate which cooperates with the side plates 68 and 70 and the top portion of the vessel 10 to effectively form a seal to prevent ambient air from entering stationary hood 12 through the opening 74 except from the area of the open mouth 12 of the vessel 10. Also, the forward edge portion of the plate 66, i.e., the portion having the arcuate notch 72 formed therein, projects outwardly from the stationary hood 16 when the movable hood 60 is in the use position shown in FIG. 6 to act as a shield or baffle inhibiting the upward movement of the expanding emissions and to direct these emissions into the opening 74.

During the charging operation when the ladle 36 is in position to pour molten metal into the BOF vessel, the ladle itself also cooperates with the structure of the BOF vessel and the movable hood to confine the emissions and to direct them into the opening 74. In like manner, the ladle 36 also cooperates to help confine the emissions in the embodiment of FIGS. 1–5. The arcuate notch 72 in the forward edge of the plate 66 is provided to avoid interference with the pivotal movement of the ladle 36 as it is rotated to pour the molten metal into the BOF vessel.

The opening leading from the movable hood 60 into the fixed hood 16, i.e., the opening 74 in plate 66, is illustrated as being substantially less than the opening 50 in the movable hood 20. This reduced opening size tends to produce a greater gas velocity through the opening which, in turn, tends to draw the emissions into the existing hood. Also, when the hood 60 is in the use position, the opening 74 is positioned off-center with respect to the open end 14 of the hood, the opening 74 being located forward in a position more nearly directly above the open mouth 12 of the BOF vessel in the charging position. It is pointed out, however, that the opening 74 could be made larger and/or shifted rearwardly as in the movable hood 20. Similarly, the opening 50 in the hood 20 could have a different size and/or location, as desired, depending upon the specific configuration of the existing process hood and its relative location to the BOF vessel, to produce the most efficient emission control.

While the embodiments of the movable hood shown in FIGS. 1–5 and in FIGS. 6–8 differ structurally, their function is quite similar in that they both cooperate with the structure of the BOF vessel itself to effectively form a conduit or duct providing a flow path for emissions discharged from the open mouth of the BOF vessel into the existing process hood when the vessel is in the charging position. At the same time, the movable hood structure effectively excludes ambient air from the portion of the existing process hood which is exposed, or uncovered, by rotation of the BOF vessel from its upright refining position to the charging position. In both embodiments described, the movable hoods function to effectively shift the opening in the existing process hood to a position generally above the mouth of the BOF vessel during charging.

While the movable hood structures are illustrated in the drawings as being constructed of metal plate members, it is understood that the intense heat to which such structures will be subjected may require the use of high temperature plates, water jacket cooling, refractory coatings, or other heat-protection means in order to prolong the life of the structure and to avoid excess heat distortion. Similarly, it is believed apparent that other structural configurations could be employed for producing the desired effect described above. Accordingly, while I have disclosed and described preferred embodiments of my invention, I wish it understood that I do not intend to be restricted solely thereto, but rather that I do intend to include all embodiments thereof which would be apparent to one skilled in the art and which come within the spirit and scope of my invention.

I claim:

1. In a metallurgical processing system including a converter vessel having a charging opening at its upper end and being mounted for rotation about a substantially horizontal axis between an upright refining position in which the charging opening is disposed in a substantially horizontal plane at the top of the vessel and a charging position in which the charging opening is displaced laterally and inclined with respect to its refining position, and a fixed gas collection hood mounted above the converter vessel and having an open inlet disposed in spaced, substantially concentric opposed relation with the charging opening in its refining position, the improvement comprising, movable hood means associated with the fixed hood for capturing emissions discharged from the converter vessel in the charging position and directing the emissions into the open inlet of the fixed hood, the movable hood means including, a substantially flat, generally horizontal top plate movable between a retracted position spaced laterally from said fixed hood and a use position disposed beneath and in closely spaced relation to the open inlet of the fixed hood, said top plate having a size at least as great as the open inlet in the fixed hood, an opening in said top plate, said opening being located beneath the open inlet in the fixed hood when the top plate is in the use position, downwardly extending sidewall means rigidly mounted on said top plate for movement therewith, said sidewall means including a pair of plates mounted one on each side of said top plate means in position to extend adjacent the sides of the converter vessel at the top thereof when the movable hood is in the use position and the converter vessel is in the charging position, and sealing plate means for engaging the outer surface of said converter vessel on the side thereof opposite the direction to which the charging opening is tilted and cooperating with said converter vessel wall, said sidewall means and said top wall for effectively preventing ambient air from entering said fixed hood from the side of the converter vessel opposite the charging opening when the converter vessel is in the charging position.

2. The invention as defined in claim 1 wherein said movable hood comprises an elongated hollow duct having a generally rectangular cross section and including vertically spaced, generally parallel top and bottom walls, opposed sidewalls joining the top and bottom walls, and front and back end walls closing the ends of the duct, said sealing plate means defining said bottom wall, said bottom wall having an opening extending therethrough in position to extend above at least a major portion of the charging opening in the converter vessel when the movable hood is in the use position and the converter vessel is in the charging position.

3. The invention as defined in claim 2 further comprising elongated track means having one end supported on said fixed hood, and wheel means supporting said movable hood for movement along said track means between the retracted position and the use position.

4. The invention as defined in claim 3 further comprising power means for driving said movable hood along said track means.

5. The invention as defined in claim 2 wherein the bottom wall of said generally rectangular duct is located at a level below the top edge portion of the charging opening when the converter vessel is in the charging position whereby the top edge portion of the converter vessel projects into said duct through the opening in said bottom wall when the duct is in the use position and the converter vessel is in the charging position.

6. The invention as defined in claim 5 wherein the opening in the bottom wall is in the form of an elongated slot having generally parallel side edges extending from the forward wall to a position spaced from the back end wall.

7. The invention as defined in claim 6 wherein said elongated slot terminates in a curved edge spaced from said back end wall and joining said generally parallel side edges, the curved edge conforming generally to the contour of the converter vessel and being adapted to cooperate therewith to form a seal to prevent the entrance of air into the duct in the vicinity of the curved edge.

8. The invention as defined in claim 7 further comprising a generally arch-shaped notch formed in and extending upwardly from the bottom edge of said front end wall, said arch-shaped notch forming a continuation of the opening in said bottom wall and providing clearance for the top portion of the converter vessel position whereby the duct may be moved into and out of the use position when the converter vessel is in the charging position.

9. The invention as defined in claim 8 wherein the opening in said top wall is substantially smaller than the opening in the fixed hood.

10. The invention as defined in claim 9 wherein the geometric center of the opening in the top wall is offset with respect to the geometric center of the opening in the fixed hood in the direction toward the front end wall of the movable hood.

11. The invention as defined in claim 10 further comprising elongated track means having one end supported on said fixed hood, and wheel means supporting said movable hood for movement along said track means between the retracted position and the use position.

12. The invention as defined in claim 7 wherein the opening in said top wall is substantially smaller than the opening in the fixed hood.

13. The invention as defined in claim 7 wherein the geometric center of the opening in the top wall is offset with respect to the geometric center of the opening in the fixed hood in the direction toward the front end wall of the movable hood.

14. The invention as defined in claim 7 further comprising elongated track means having one end supported on said fixed hood, and wheel means supporting said movable hood for movement along said track means between the retracted position and the use position.

15. The invention as defined in claim 14 further comprising a generally arch-shaped notch formed in and extending upwardly from the bottom edge of said front end wall, said arch-shaped notch forming a continuation of the opening in said bottom wall and providing clearance for the top portion of the converter vessel position whereby the duct may be moved into and out of the use position when the converter vessel is in the charging position.

16. The invention as defined in claim 15 further comprising power means for driving said movable hood along said track means.

17. The invention as defined in claim 1 wherein said top plate, said sidewall means, and said sealing plate means cooperate with said converter vessel to define a confined flow path from a position above the charging opening of the converter vessel through said opening in said top plate into said fixed hood when the converter vessel is in the charging position and the movable hood is in the use position.

18. The invention as defined in claim 17 wherein said sealing plate means comprises a baffle plate extending between said side walls and projecting downwardly from said top plate, said baffle plate having a bottom edge contoured to engage and cooperate with the external surface of the converter vessel to form a seal effectively preventing the flow of air therebetween when the converter vessel is in the charging position and the movable hood is in the use position.

19. The invention as defined in claim 18 wherein said top plate has a length, measured in the direction of movement between the retracted position and the use position, which is greater than the corresponding dimension of the inlet opening of the fixed hood, and wherein the top plate has a front edge portion which projects laterally from the fixed hood and extends above at least the major portion of the charging opening in the converter vessel when the converter vessel is in the charging position and the movable hood is in the use position.

20. The invention as defined in claim 19 wherein said front edge portion has an arcuate notch formed therein in position to facilitate access to the charging opening from a ladle used to charge the converter vessel with molten metal.

21. The invention as defined in claim 20 whereby said baffle plate is disposed at an acute angle relative to said top plate with the bottom edge of the baffle plate projecting forwardly toward said front edge portion of the top plate.

22. The invention as defined in claim 20 wherein said baffle plate has its top edge joined to said top plate at a position spaced from the opening formed in said top plate on the side thereof opposite to said front edge portion.

23. The invention as defined in claim 22 wherein the opening in said top plate is substantially smaller than the opening in the fixed hood.

24. The invention as defined in claim 23 wherein the geometric center of the opening in the top plate is offset with respect to the geometric center of the opening in the fixed hood in the direction toward the front edge portion of the movable hood.

25. The invention as defined in claim 24 further comprising elongated track means having one end supported on said fixed hood, and wheel means supporting said movable hood for movement along said track means between the retracted position and the use position.

26. The invention as defined in claim 25 further comprising power means for driving said movable hood along said track means.

27. The invention as defined in claim 18 whereby said baffle plate is disposed at an acute angle relative to said top plate with the bottom edge of the baffle plate projecting forwardly toward said front edge portion of the top plate.

28. The invention as defined in claim 18 wherein the opening in said top plate is substantially smaller than the opening in the fixed hood.

29. The invention as defined in claim 28 wherein the geometric center of the opening in the top wall is offset with respect to the geometric center of the opening in the fixed hood in the direction toward the front edge portion of the movable hood.

30. The invention as defined in claim 18 further comprising elongated track means having one end supported on said fixed hood, and wheel means supporting said movable hood for movement along said track means between the retracted position and the use position.

* * * * *

UNITED STATES PATENT AND TRADEMARK OFFICE
CERTIFICATE OF CORRECTION

PATENT NO. : 4,234,170

DATED : November 18, 1980

INVENTOR(S) : John R. Suitlas

It is certified that error appears in the above—identified patent and that said Letters Patent is hereby corrected as shown below:

Column 7, line 60, after "top", "wall" should read -- plate --.

Column 8, line 3, after "said", first occurrence, insert -- top plate defining said top wall and said --.

*Signed and Sealed this*

*Third* Day of *March 1981*

[SEAL]

*Attest:*

*Attesting Officer*

RENE D. TEGTMEYER

*Acting Commissioner of Patents and Trademarks*